Dec. 17, 1940.   R. H. GEORGE   2,225,044
METHOD AND MEANS FOR REPRODUCING INFRARED IMAGES
Filed June 16, 1938
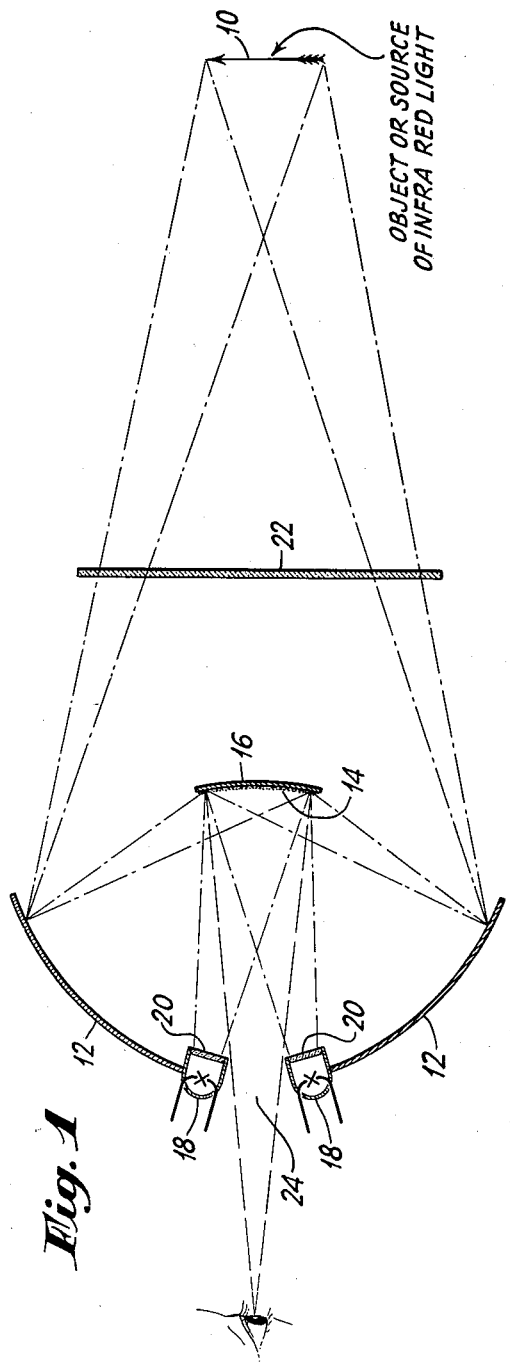
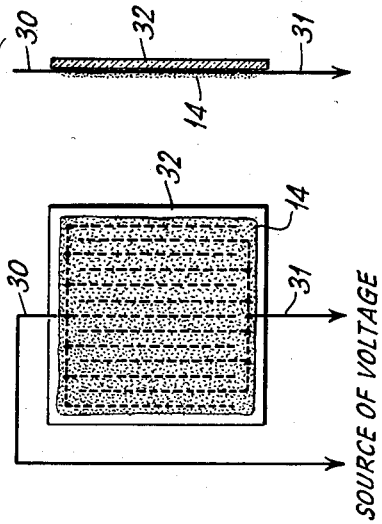
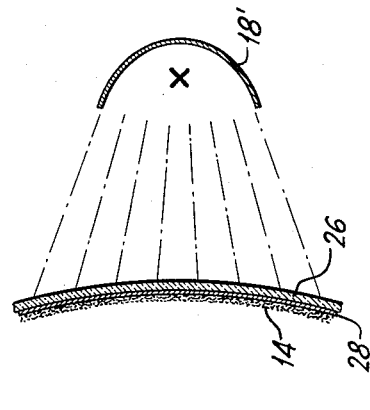
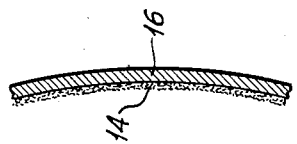
INVENTOR.
ROSCOE H. GEORGE
BY H.S. Snover
ATTORNEY.

Patented Dec. 17, 1940

2,225,044

UNITED STATES PATENT OFFICE 2,225,044

METHOD AND MEANS FOR REPRODUCING INFRARED IMAGES

Roscoe H. George, West Lafayette, Ind., assignor to Radio Corporation of America, a corporation of Delaware Application June 16, 1938, Serial No. 214,171

4 Claims. (Cl. 250—83)

The purpose of this invention is to provide means whereby infrared radiations, which are normally beyond the visibility range, may be made visible.

It is well known that infrared radiations or radiations of a wave length of 7,500 to 10,000 or more Angstrom units are more readily transmissible through fog conditions than are wave lengths in the visible range or in the ultra-violet range. Since infrared radiations may be more readily transmitted through fog, and since infrared radiations are not visible to the naked eye, some means must be provided whereby such radiations are rendered visible or some means whereby the presence of such infrared radiations will cause phosphorescence or luminescence of some screen material. When such means has been provided it then becomes possible, through the use of appropriate infrared radiators at an airport, for a pilot of an airplane to locate the landing field even under adverse fog conditions, or as another use, it is possible for ships at sea to be visible to one another when normally obscured by fog.

It is known that certain substances can be excited to phosphorescence by the absorption of energy from ultra-violet or visible light, cathode ray bombardment, and in some cases by exposure to high potential gradients. When certain phosphorescent materials are used, the material gives off the absorbed energy at a relatively slow rate, so that after the material has been exposed to ultra-violet light cathode ray bombardment or high potential gradients, a prolonged phosphorescence or glowing of the material will result. This phosphorescence is of a wave length such that it may be seen by the naked eye, and may be therefore classified as visible light. It has been found that the rate at which the absorbed energy is released and accordingly the intensity of phosphorescence can be greatly increased by exposing the phosphorescent material to infrared radiations. Such radiations release the absorbed energy so that the phosphorescent period is decreased yet the degree of phosphorescence during the time of such release is materially increased.

It is one purpose of the present invention therefore to utilize the above principle and phenomenon to convert infrared images or radiations into visible radiations or images.

It is a further purpose of the present invention to provide means whereby infrared radiations which originate at a remote point may, through the intermediary of ultra-violet light and appropriate phosphorescent materials, be made visible or be converted into wave lengths which lie within the visible spectrum.

It is a further purpose of the present invention to use ultra-violet light as a means for exciting a phosphorescent material so that the presence of infrared light may effect the release of such excitative energy.

It is still another purpose of the present invention to provide electrical potential gradients for exciting a phosphorescent material whereby the energy absorbed from the potential gradients may be released in accordance with received infrared radiations.

Still other purposes and advantages of the present invention will become more apparent to those skilled in the art from a reading of the following specification and claims, particularly when considered with the drawing, wherein like elements are designated by like reference characters and wherein:

Figure 1 shows one form of a means and method for rendering infrared radiations visible in accordance with the present invention;

Figure 2 is a detailed showing of a portion of Figure 1;

Figure 3 is a modification of a portion of Figure 1; and

Figure 4 is a still further modification of a portion of Figure 1.

Referring now to the drawing, Figure 1 represents a more or less schematic arrangement of the elements necessary to render infrared radiations visible. The object to be observed or the source of infrared radiations 10 would normally be located at a remote point and the infrared radiations from this object are permitted to fall upon a parabolic reflector 12 for focusing such radiations upon a fluorescent screen 14. The screen 14 is composed of a fluorescent or phosphorescent material such as zinc sulphate ($ZnSO_4$) or magnesium sulphate ($MgSO_4$), or any other material which, when excited by ultra-violet light or some other similar radiation may absorb energy the rate of release of which is controlled by the quantity of infrared light which is permitted to fall upon the phosphorescent or fluorescent material. The material used may be placed upon a polished material reflector 16 as shown in detail in Figure 2, and the reflector and phosphorescent or fluorescent material carried thereby may be supported in proper relationship with respect to the parabolic reflector 12 by any appropriate means.

For the purpose of exciting the fluorescent or phosphorescent material 14 one or more sources 18 of ultra-violet light are provided. In order that the visible radiations from the light sources 18 may be filtered so that only the ultra-violet radiations are permitted to reach the screen material 14, proper filtering means 20 may be provided. Furthermore, for the purpose of preventing visible light from being projected upon the screen material 14, a filter 22 permeable to infrared radiations may be provided, the filter being particularly useful when the system is used during the daytime. For best operation of the system it is desirable that only the infrared radiations from the object to be observed be permitted to be projected upon the phosphorescent material 14. For the purpose of observing an image on the phosphorescent or fluorescent material 14, an opening 24 is provided in the parabolic reflector.

In operation, the ultra-violet light from the sources 18 is projected upon the material 14 to cause an excitation of the material which results in a faint glowing or slow release of such excitation because of the energy absorbed by the material 14 from the ultra-violet light sources 18. If no infrared radiations are directed upon the material 14 this release of energy is constant over the entire surface 14, and the screen then appears as a uniformly lighted or glowing surface. When infrared radiations are directed upon the screen 14 by reason of the parabolic reflector 12, an image of the infrared radiation will appear on the screen 14 by reason of the fact that the energy absorbed by the screen from the ultra-violet sources 18 is more rapidly released therefrom. An infrared radiator in the form of an arrow would, therefore, present itself upon the screen 14 as an image of the arrow, the image appearing as a brighter portion over the surface of the screen material.

As a modification of the device described and shown in Figure 1, the screen material 14 may be deposited upon a quartz plate 26 as shown in Figure 3. To improve the operation of the device and to better reflect the infrared radiations as well as the effect of these radiations, the quartz plate 26 may be supplied with a thin layer of silver 28 which is positioned between the fluorescent or phosphorescent coating 14 and the quartz plate 26. When such a construction is used it is possible to position the ultra-violet source of light 18' behind the screen and quartz plate 26 rather than in the position shown in Figure 1. When this is done the silvered quartz plate serves both as a reflector for the visible and infrared radiations and as a filter to prevent the visible light from the ultra-violet source 18' from reaching the screen material.

In order to concentrate the light or the glow which is released by the material 14, it is preferred that the support for the material be slightly concave as shown in the figures of the drawing. The radius of curvature for the support of the screen material is not critical and can be determined from the physical dimensions of the other elements of the system.

Another modification of the present invention is shown in Figure 4 in which the screen material is excited by means of a plurality of parallel wires embedded in the screen material. These parallel wires do not come in contact with each other but are merely positioned so that a difference of potential may be applied between adjacent parallel wires. Insofar as the excitation of the material is concerned, one group of parallel wires is connected to terminal 30 whereas the other group is connected to terminal 31 and to these terminals may be applied an electrical potential which may be continuous or intermittent and which may be unidirectional or alternating. When no infrared radiations are directed upon the material the energizing of the wires causes a glowing of the fluorescent or phosphorescent material and this glowing is accelerated or amplified when an infrared image is projected upon the material. Insofar as the modification shown in Figure 4 is concerned, the support member 32 for the energizing wires and the material may be made of metal as explained in connection with the discussion of Figure 1 or it may be made of quartz as explained in connection with Figure 2. The necessity for using quartz as a support member is, however, more or less obviated when the phosphorescent material is excited by the application of a potential since no visible light is present as is the case in Figures 1 and 3. It would be possible, therefore, to make the support member 32 of glass, which, in order to improve the operation of the system, may be silvered on the back thereof. There is, however, a distinct advantage in using an electrical potential for exciting the material 14 since an effect equivalent to the use of ultra-violet light only is accomplished.

From the above it may be seen that a simple and effective method and means have been provided whereby infrared radiations may be rendered visible or wherein the energy released from a phosphorescent or fluorescent material may be accelerated when there is a presence of infrared light.

Insofar as the use of the present system with regard to landing airplanes during fog is concerned, it is only necessary to provide an appropriate number of infrared radiators at the airport and when these have been provided their position may be clearly ascertained when an apparatus such as that described for receiving such radiations is provided on an airplane. The infrared radiators may, for instance, be located along each side of a runway and when the pilot is provided with means constructed in accordance with this invention, the position of these infrared radiators may be clearly made visible. Furthermore, the application of the present invention and its use aboard ship, is obvious to those skilled in the art since on each ship an infrared radiator and viewing device could be provided.

Furthermore, the present invention is useful in ascertaining the position of airplanes at night, particularly under fog conditions, since a certain amount of infrared light is radiated from the exhaust manifolds of an airplane engine and this infrared light is sufficient in intensity to make the position of the airplane visible through the use of the present invention even though the airplane itself is invisible when the present invention is not used.

It is to be understood that although the device is more or less schematically shown and various optical arrangements are suggested, other optical arrangements may as well be used.

It is to be further understood that although certain materials are herein named which may be used as the fluorescent or phosphorescent material 14, other materials which have similar qualifications and characteristics might as well be used.

Various other modifications and alterations may be made in the present invention without departing from the spirit and scope thereof, and it is desired that any and all such modifications be considered within the purview of the present invention, except as limited by the hereinafter appended claims.

I claim:

1. A system for detecting the presence of infrared radiations comprising a screen of luminous material, means including a source of electrical potential for exciting the material by application of the potential thereto to cause a storage of energy therein and to produce a faint glow due to the gradual release of the energy, and means to direct infrared radiations, when present, upon said material whereby the release of the energy is temporarily accelerated and the accompanying glow of the material is accordingly temporarily increased.

2. A system for detecting the presence of infrared radiations comprising a screen of phosphorescent or luminescent material such as zinc or magnesium sulphate, means including a source of electrical potential applied directly to the material for exciting the material to cause a storage of energy therein and to produce a faint glow due to the gradual release of the energy, and means to project the image of a source of infrared radiations upon the screen material whereby the radiations, when present, will cause an acceleration in the release of the energy and accordingly an increase in the glow produced by the screen material.

3. A system for observing the presence of infrared radiations comprising a screen of luminous material, a source of spaced electrical conductors in contact with said material, means for applying an electrical potential between the conductors for exciting the material to cause a storage of energy therein, and to produce a faint glow due to the gradual release of the energy, means to direct infrared radiations, when present, upon said material whereby the release of energy is temporarily accelerated and the accompanying glow of the material is accordingly temporarily increased.

4. A system for observing the presence of infrared radiations comprising a screen of luminous material, a plurality of spaced electrical conductors in contact with the luminous material, means including a source of electrical potential for energizing the conductors to excite the material and to cause a storage of energy therein whereby a faint glow is produced due to the gradual release of the energy, and means to project the image of a source of infrared radiations upon the screen material whereby the radiations, when present, will cause at least a temporary acceleration in the release of the energy and a corresponding increase in the glow produced by the screen material so that the image will be rendered visible.

ROSCOE H. GEORGE.